May 9, 1939.  F. WELTY  2,157,744
HEAT EXCHANGER
Filed March 22, 1938  2 Sheets-Sheet 1
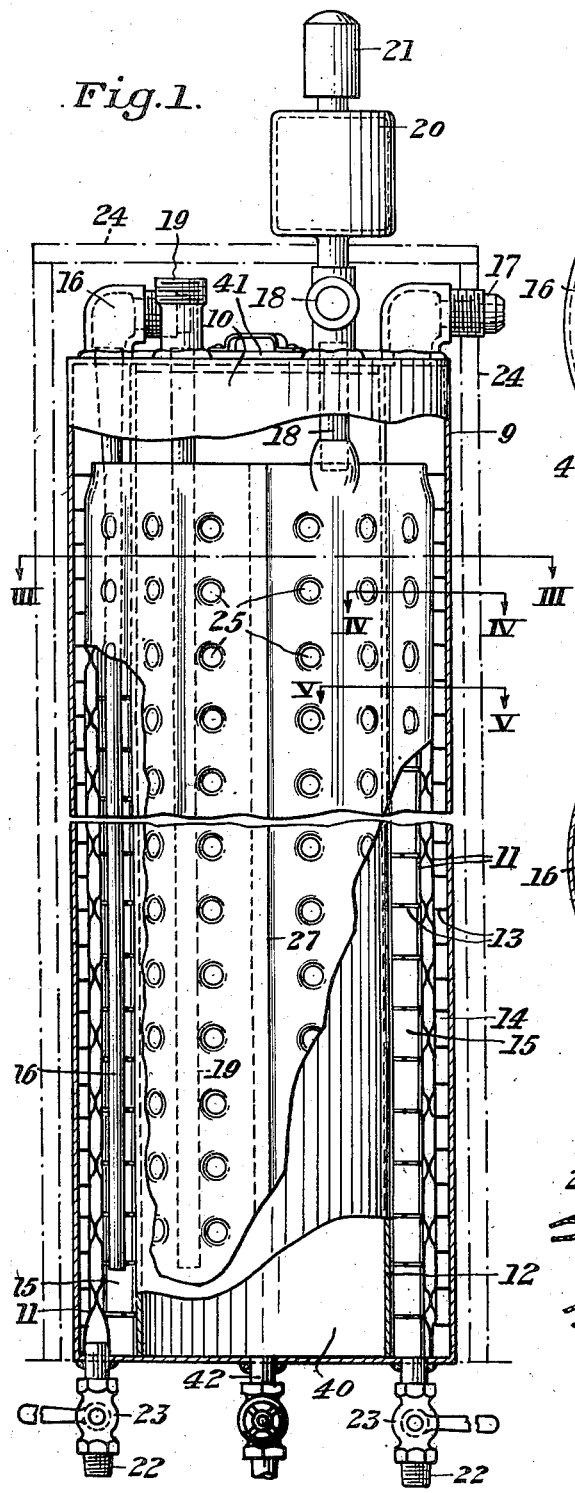
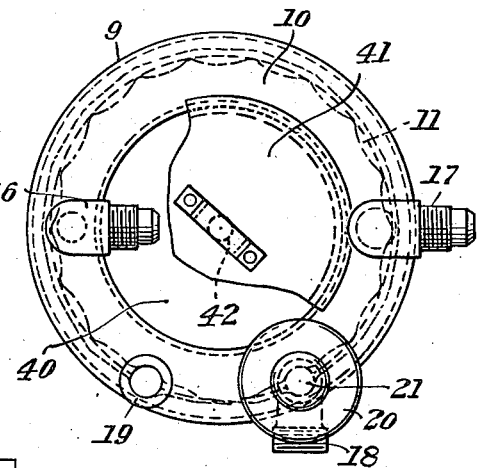
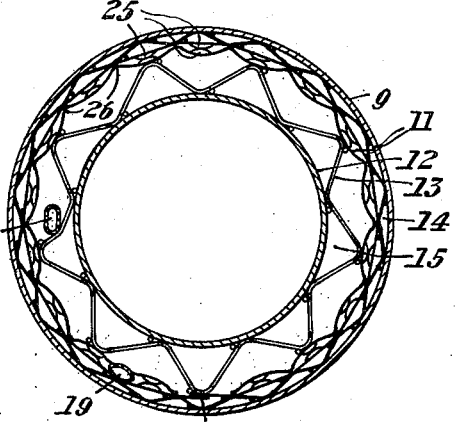
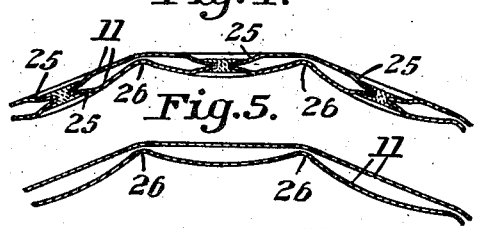
INVENTOR
Frank Welty
by his
attys.
Stebbins, Blenko + Parmelee May 9, 1939.  F. WELTY  2,157,744
HEAT EXCHANGER
Filed March 22, 1938   2 Sheets-Sheet 2

INVENTOR
Frank Welty
by his attys.
Stebbins, Blenko & Parmelee

Patented May 9, 1939

2,157,744

UNITED STATES PATENT OFFICE 2,157,744

HEAT EXCHANGER

Frank Welty, Youngstown, Ohio

Application March 22, 1938, Serial No. 197,380

3 Claims. (Cl. 257—232)

The present invention relates broadly to heat exchangers and, more particularly, to that class of heat exchangers which are utilized for the more or less instantaneous heating or cooling of fluids. By the present invention, as will be apparent from the discussion contained hereinafter, I provide a heat exchanger which has numerous advantages over the prior art structures and which overcomes numerous deficiencies in such structures.

The present invention is particularly applicable to liquid dispensing such as the dispensing of beer and other carbonated beverages and, consequently, it will be particularly described herein as a beer dispenser. However, it should be understood that a heat exchanger of the type which I provide by my invention is not limited to the dispensing of such beverages and that it may be utilized in various different environments where a fluid is to be heated or cooled.

Draught beer is supplied by breweries to retail outlets in barrels. The beer in the barrels is under considerable pressure due to the presence in the beer of carbon dioxide, and is at too high a temperature to be palatable. Therefore, a dispenser is necessary which will both cool the beer and control the flow of beer under pressure. Heretofore dispensers have been used which pass the beer through coils which are cooled by various methods. These coils cool the beer to the proper temperature and adequately control the flow of beer, but they have a very limited capacity. Thus, in cooling beer from 80° F. to 40° F. the capacity of the dispensers heretofore used has been limited to approximately ten gallons an hour. If the capacity of the coils in the dispensers is increased, the beer is not sufficiently cooled. It is one of the purposes of my invention to provide a heat exchanger which will control the flow of beer and at the same time cool it with such rapidity that the capacity of the dispenser is greatly increased.

In the accompanying drawings I have illustrated certain present preferred embodiments of my invention. In the drawings, Figure 1 is an elevational view, partially in section, of a beer dispenser embodying my invention, certain of the exterior parts being broken away to show the interior;

Figure 2 is a plan view of the structure shown in Figure 1;

Figure 3 is a section along the line III—III of Figure 1;

Figure 4 is a section along the line IV—IV of Figure 1;

Figure 5 is a section along the line V—V of Figure 1;

Figure 6:
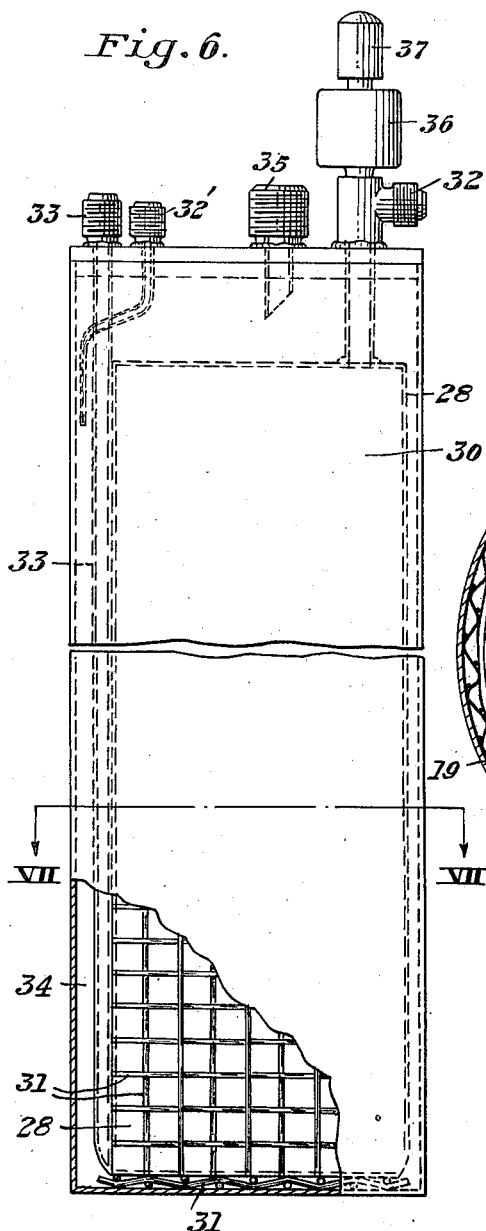
Figure 6 is an elevational view of a modified form of a beer dispenser embodying my invention, the exterior parts being broken away.

As shown in Figures 1 and 2, the dispenser 10 comprises an outer cylindrical tank 9 which is closed by a top 10. The tank 9 encloses a separate annular container 11 in which the beer is caused to circulate. The construction of this container 11 will be described more in detail in connection with the discussion of Figures 3, 4, and 5. A second cylindrical tank 12 is positioned within the annular container 11. The tanks 9 and 12 and the annular container 11 are maintained in spaced relationship by wire mesh 13 which is placed on both sides of the annular container 11. This arrangement of the tanks 9 and 12 and the annular container 11 provides two passageways 14 and 15, in which a refrigerant is caused to circulate and thereby cool the beer which is circulated in the annular container 11. The refrigerant, preferably a gas in a liquid state, is pumped by a suitable compressor pump into the dispenser through the refrigerant inlet pipe 16 which extends to the bottom of the passageway 15. The refrigerant flows upward around the annular container 11 cooling the beer in the chamber 11 by evaporation, and is drawn off as a gas through the refrigerant outlet pipe 17. Beer is supplied to the dispenser through the inlet pipe 18 which is connected to the annular container 11. The beer flows down through the annular container and is drawn out through the beer outlet pipe 19 which extends down to the bottom of the annular container.

A small tank 20 is connected to the beer inlet pipe 18 before the pipe enters the dispenser. This tank 20 acts as an overflow reservoir and is used to settle "wild" beer which is foaming. An air valve 21 is mounted on top of the tank 20 and allows air to escape when the container is first filled. Drain pipes 22 are provided at the bottom of the annular container 11 and the passageway 15, and are controlled by valves 23. To prevent absorption of heat from the atmosphere, the entire dispenser may be enclosed in an insulating cap 24.

Figures 3, 4 and 5 illustrate the construction of the annular container 11 and the arrangement of the container between the tanks 9 and 12. As shown in these drawings, the container 11 is made up from two flat sheets of metal which are welded together to form a double-walled cylinder. At spaced intervals over the area of these sheets inwardly extending bosses 25 are stamped in the sheets. The sheets are then spot-welded together at the point of contact of these bosses. Portions 26 of the inner wall of the container 11 are creased outwardly in the direction of the outer wall to lessen the space between the two walls and thus make a smaller passageway for the beer. The volume of beer flowing through the container is thereby distributed so as to make a large area of contact with the cold walls of the annular container, and at the same time prevent a large pressure drop in the container.

Any carbon dioxide which escapes from the beer in the annular container 11 necessarily flows up through the same passageways, comes in contact with beer flowing down through the container, and is thereby compressed back into the beer. I have sometimes found it advisable to emboss only one wall of the annular container when the dispenser is being used for beer. In some cases it is desirable to employ additional means, such as a restricted faucet, to control the flow of beer.

Wire mesh 13 is placed between the annular container 11 and the tank 9 as well as between the annular container 11 and the tank 12. This mesh serves to keep the various containers in their correct position and increases the cooling effect of the refrigerant which flows around the mesh by causing a slight agitation of the refrigerant. The mesh also serves to strengthen the tanks and the walls of the annular container so that they may be made of thinner metal. The thinner metal walls increase the rate of cooling.

The beer inlet pipe 18 is connected to the top of the annular container 11 on a side of the seam weld 27 opposite the side from which the beer outlet pipe 19 extends. By arranging the inlet and outlet pipes on opposite sides of the seam weld, the beer is forced to flow completely around the annular container 11.

Figure 8:
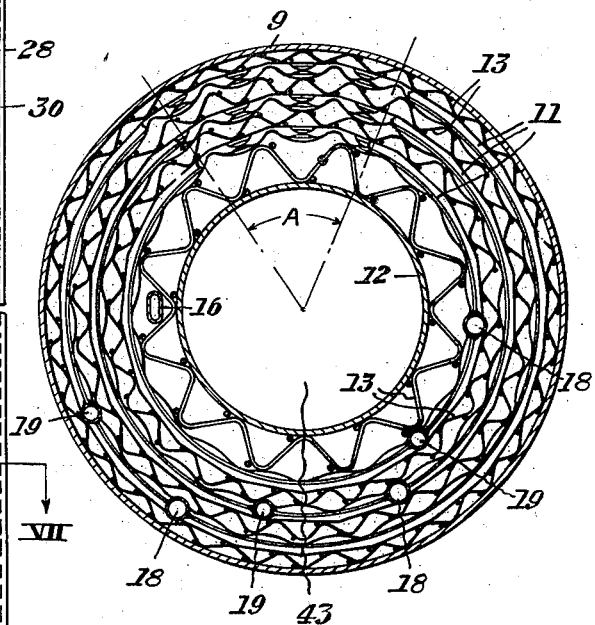
Figure 8 is a section through a further modification of my invention.

Figure 8 shows another arrangement of the annular container and the tanks whereby several containers may be concentrically arranged and several different kinds of beer or several different beverages may be dispensed from a single compact unit. The segment A in the cross-section shown in Figure 8 is a section through the bosses stamped in the walls of the annular containers 11. The remaining portion of the cross-section is a section through the body portion of the tank above the annular containers. In this arrangement only one inner tank 12 and one outer tank or casing 9 are used and the several annular containers 11 in which the beer circulates are separated by wire mesh 13. The arrangement of the beer inlets and outlets and the refrigerant inlets and outlets is the same as described with reference to Figures 1 and 2.

Figure 7:
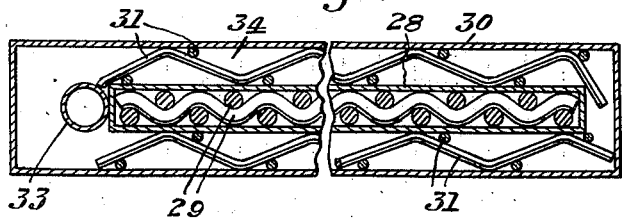
Figure 7 is a section along the line VII—VII of Figure 6.

Figures 6 and 7 illustrate another form of my invention. In this form the beer circulates through a thin rectangular tank 28. Wire mesh 29 is placed inside the rectangular tank 28 to prevent the thin walled tank from collapsing and to increase the cooling efficiency of the dispensing unit by a cataract action occurring when the beer flows down over the mesh. The rectangular tank 28 is placed within an outer tank 30 and is kept in spaced relationship therewith by wire mesh 31 which surrounds the outside of the tank 28. Beer flows into the tank 28 through a beer inlet pipe 32 and flows down through the tank and up through the beer outlet pipe 33 which is connected to the bottom of the tank 28. Liquid refrigerant is pumped by the usual compressor pump through the refrigerant inlet pipe 32' into the space 34 between the tanks 28 and 29. Refrigerant in the form of gas is drawn out of the space 34 through the refrigerant outlet pipe 35.

A small tank 36 and an air valve 37 are connected to the beer inlet pipe 32 before it enters the tank 28 and operate in the same manner as the small tank 29 and air valve 21 described with reference to Figure 1.

In the structure shown in Figure 1 the central portion or chamber 40 may be utilized for the purpose of cooling and dispensing a further liquid in addition to that which is cooled in the main cooling chamber of that structure. For example, a cover 41 may be placed over the upper end of this chamber and an outlet 42 placed in the bottom of this chamber and the liquid to be cooled and dispensed may be supplied to this chamber in any suitable manner and drawn therefrom through the outlet 42. In such a device as that shown in Figure 1 the main cooling chamber may be utilized for the cooling and dispensing of beer and the inner chamber 40 may be used for cooling and dispensing water. It will be understood of course that this inner chamber can be utilized for the purpose of dispensing liquids other than water. If desired this inner chamber may be utilized for dispensing carbonated beverages by providing coils for carrying the beverage, which coils will be submerged in the water within the inner chamber.

In the device shown in Figure 8 a similar arrangement may be employed. The inner chamber 43 may be appropriately capped at both ends and an appropriate inlet and an appropriate outlet provided for supplying the additional liquid thereto and for drawing it therefrom. With this device it will be possible to dispense three different kinds of beer from the main cooling chambers and a further beverage from the inner chamber.

In actual tests a dispenser constructed in accordance with my invention cooled beer from 80° F. to 40° F. and delivered it at the rate of 40 gallons an hour. This capacity could be increased by increasing the size of the dispenser. Excessive foaming was prevented and the beer was served at a temperature suitable for drinking. The extremely rapid transfer of heat made possible by my apparatus permits a dispenser to supply a continuous draw of beer at a definite temperature. The particular construction of the container in which the beer circulates results in a large area of contact between the beer and the walls of the chamber. At the same time the total cross-sectional area of the passageways through the chamber is sufficiently great to prevent a large pressure drop in the container. It is therefore not necessary to use high pressure to force the beer through the unit.

It will be readily apparent from what has been stated above that several individual units can be embodied in one cylindrical tank in the manner shown in Figure 8 and various beverages dispensed. It will also be evident that any desirable number of the individual units can be placed in an outer shell such as the shell 24 of Figure 1 and various different beverages dispensed from the several units. It will also be apparent that each unit is self-contained and may be mounted in its own individual insulated cabinet, or several may be mounted in one cabinet and placed in series so as to increase the output capacity of the dispenser.

It will also be evident that foam control of all of the beers dispensed by the various units can be obtained. In some of the present commercial structures it is only possible to obtain foam control of one of the several beers being dispensed. This is effected by providing a reservoir in the center of the coils where the pressure may be reduced and the beer drawn from the reservoir. On the other hand, in the structure provided by my invention individual foam control on each of the units can be obtained.

While I have described certain present preferred embodiments of my invention, it is to be understood that it is not limited thereto but may be otherwise variously embodied within the scope of the following claims.

What is claimed is:

1. In a dispensing and cooling apparatus for carbonated beverages, the combination of a beverage container comprising spaced metal plates welded to each other around the peripheries thereof, one of said plates having a plurality of inwardly extending bosses at spaced points along a plurality of substantially parallel lines and being secured to the other plate at said bosses and the other of said plates being creased along spaced parallel lines between said bosses to provide restricted areas through which the beverage is circulated, said metal plates being bent to form a cylindrical circulation chamber, a beverage inlet at one end of said chamber and a beverage outlet adjacent the other end of said chamber, whereby the beverage must pass completely through the container during its passage from the inlet to the outlet, a refrigerant circulation container extending around said beverage container, and means including an inlet and an outlet for circulating a refrigerant around and in contact with the beverage container.

2. A dispensing and cooling apparatus for carbonated beverages as claimed in claim 1, in which a plurality of beverage containers each having an inlet and an outlet are co-axially arranged within the refrigerant container.

3. In a dispensing and cooling apparatus for carbonated beverages, the combination of a beverage container comprising spaced metal plates united together around their peripheries, one of said plates having a plurality of depressions therein extending into contact with the other of said plates, said depressions being arranged along a plurality of substantially parallel lines, the other of said plates being creased intermediate said depressions to provide restricted areas between said depressions, means including an inlet at one end and an outlet at the other end for circulating a beverage through said container, a refrigerant container extending around said beverage container, and means including an inlet and an outlet for circulating a refrigerant through said refrigerant container, the area between said plates of the beverage container being sufficiently restricted to provide a substantial pressure drop between the inlet and the outlet thereof.

FRANK WELTY.